United States Patent
Chen et al.

(10) Patent No.: US 9,760,349 B1
(45) Date of Patent: Sep. 12, 2017

(54) MANAGING DIFFERENT SOFTWARE DEPENDENCIES ASSOCIATED WITH SOURCE CODE

(71) Applicant: Red Hat, Inc., Raleigh, NC (US)

(72) Inventors: Huamin Chen, Westboro, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/347,355

(22) Filed: Nov. 9, 2016

(51) Int. Cl.
*G06F 9/45* (2006.01)
*G06F 9/44* (2006.01)

(52) U.S. Cl.
CPC ............... *G06F 8/433* (2013.01); *G06F 8/75* (2013.01)

(58) Field of Classification Search
CPC .................................. G06F 8/433; G06F 8/75
USPC ............... 717/124–129, 140–143, 153–155
See application file for complete search history.

(56) References Cited

U.S. PATENT DOCUMENTS

| | | | | |
|---|---|---|---|---|
| 5,764,989 A * | 6/1998 | Gustafsson | ............... | G06F 8/48 714/E11.21 |
| 6,519,767 B1 * | 2/2003 | Carter | ..................... | G06F 9/443 712/E9.084 |
| 6,986,132 B1 * | 1/2006 | Schwabe | ............. | G06F 9/44589 717/166 |
| 7,107,585 B2 * | 9/2006 | Berent | ..................... | G06F 8/447 714/E11.205 |
| 7,191,435 B2 | 3/2007 | Lau et al. | | |
| 7,222,341 B2 | 5/2007 | Forbes et al. | | |
| 7,478,374 B2 * | 1/2009 | Guilford | ............. | G06F 11/3624 714/E11.207 |
| 7,506,324 B2 * | 3/2009 | Thiagarajan | .............. | G06F 8/10 715/235 |
| 7,908,594 B2 * | 3/2011 | Varanasi | ............. | H04L 41/0226 707/760 |
| 8,006,240 B2 | 8/2011 | Bhatkhande et al. | | |

(Continued)

FOREIGN PATENT DOCUMENTS

CN 105046155 A 6/2015

OTHER PUBLICATIONS

Li et al, "Effective Fault Localization Based on Minimum Debugging Frontier Set", IEEE, pp. 1-10, 2013.*

(Continued)

*Primary Examiner* — Anil Khatri
(74) *Attorney, Agent, or Firm* — Kilpatrick Townsend & Stockton LLP

(57) ABSTRACT

Software dependencies can be managed by a system. For example, the system can determine multiple dependencies associated with source code for software. A dependency can be a segment of program code that is separate from the source code and to be incorporated into the source code. The system can determine multiple attributes associated with the multiple dependencies. Each attribute can be associated with a respective dependency and indicate if the respective dependency is at least one of (i) an essential dependency that is necessary to create executable code from the source code, (ii) a nonessential dependency that is unnecessary to create the executable code from the source code, or (iii) an expiring dependency for which there is a newer version of the dependency available that is incompatible with the source code. The system can sort the multiple dependencies based on the multiple attributes.

20 Claims, 6 Drawing Sheets

(56) References Cited

U.S. PATENT DOCUMENTS

| | | | | |
|---|---|---|---|---|
| 8,079,023 | B2* | 12/2011 | Chen | G06F 8/437 717/139 |
| 8,161,463 | B2* | 4/2012 | Johnson | G06F 21/14 713/190 |
| 8,397,222 | B2* | 3/2013 | Warren | G06F 8/40 717/136 |
| 8,464,228 | B2* | 6/2013 | Campbell | G06F 8/36 717/140 |
| 8,543,998 | B2 | 9/2013 | Barringer | |
| 8,607,206 | B2* | 12/2013 | Freeman | G06F 8/456 717/104 |
| 8,689,194 | B1* | 4/2014 | Pillarisetti | G06F 8/35 717/140 |
| 8,707,278 | B2* | 4/2014 | Balakrishnan | G06F 8/24 717/136 |
| 8,726,251 | B2* | 5/2014 | Kalogeropulos | G06F 8/452 717/140 |
| 8,949,788 | B2 | 2/2015 | Bonnet | |
| 9,032,377 | B2* | 5/2015 | Mizrachi | G06F 8/41 710/6 |
| 9,170,810 | B2 | 10/2015 | Koutyrine et al. | |
| 9,489,189 | B2* | 11/2016 | Sriram | G06F 8/65 |
| 2004/0261064 | A1 | 12/2004 | Goldstein et al. | |
| 2007/0294680 | A1 | 12/2007 | Papakipos et al. | |
| 2010/0088688 | A1 | 4/2010 | Edwards et al. | |
| 2010/0125839 | A1 | 5/2010 | Gebis et al. | |
| 2011/0239195 | A1 | 9/2011 | Lin et al. | |
| 2016/0253625 | A1 | 9/2016 | Casey | |

OTHER PUBLICATIONS

Lonnberg et al, "Java Replay for Dependence-based Debugging", ACM, pp. 15-25, 2011.*

Konopka et al, "Poster: Discovering Code Dependencies by Harnessing Developer's Activity ", IEEE, pp. 801-802, 2015.*

Yu et al, "Removing False Code Dependencies to Speedup Software Build Processes ", ACM, pp. 1-10, 2003.*

Wang et al, Generating Precise Dependencies for Large Software, IEEE, pp. 47-50, 2013.*

Angerer et al, "Identifying Inactive Code in Product Lines with Configuration-Aware System Dependence Graphs", ACM, pp. 52-61, 2014.*

Harman et al, "Dependence Clusters in Source Code", ACM Transactions on Programming Languages and Systems, vol. 32, No. 1, Article 1, pp. 1-33, 2009.*

Obrien, T., "What is an Artifact Repository?", http://blog.sonatype.com/2009/04/what-is-a-repository/, Apr. 2009.

"Guide to Uploading Artifacts to the Central Repository", https://maven.apache.org/guides/mini-guide-central-repository-upload.html.

"The NPM Debacle was Partly your Fault (and Here's What You Can do About It)", http://www.letscodejavascript.com/v3/blog/2014/03/the_npm_debacle, Mar. 2014.

Williams, C. "How one developer just broke Node, Babel and thousands of projects in 11 lines of JavaScript", http://www.theregister.co.uk/2016/03/23/npm_left_pad_chaos/, Mar. 2016.

* cited by examiner

MANAGING DIFFERENT SOFTWARE DEPENDENCIES ASSOCIATED WITH SOURCE CODE

TECHNICAL FIELD

The present disclosure relates generally to software debugging. More specifically, but not by way of limitation, this disclosure relates to managing software dependencies.

BACKGROUND

Software developers can create software applications using one or more programming languages, such as JavaScript®, C++, Java®, Python®, Perl®, or PHP®. A software developer can write a set of instructions in a programming language that causes a software application to behave in a particular manner. The instructions can be source code. In some instances, the source code can include a reference to a segment of program code, which can be separate from the source code and otherwise independent of the source code, for adding particular features to the software application. For example, the segment of program code can be stored separately from, such as a in a separate file from, the source code. The segment of program code can be a dependency, because the source code may be dependent on the segment of program code to implement the particular features.

As a particular example, source code for a website can include a reference to a JavaScript file to incorporate certain features, such as graphs or charts, into the website. The JavaScript file can be a dependency on which the website relies to implement the graphs or charts.

Developers can use dependencies for various reasons, such as to make updating a feature across multiple software applications faster and easier. For example, multiple different websites may include references to the above-mentioned JavaScript file to implement graphs. To update a feature of the graphs (e.g., a style or color-coding for the graphs) across all of the websites, a developer can simply update the single JavaScript file. This can be faster, cheaper, and easier than if the source code for each separate website had its own program code for implementing graphs that had to be individually updated.

DETAILED DESCRIPTION

Figure 1:
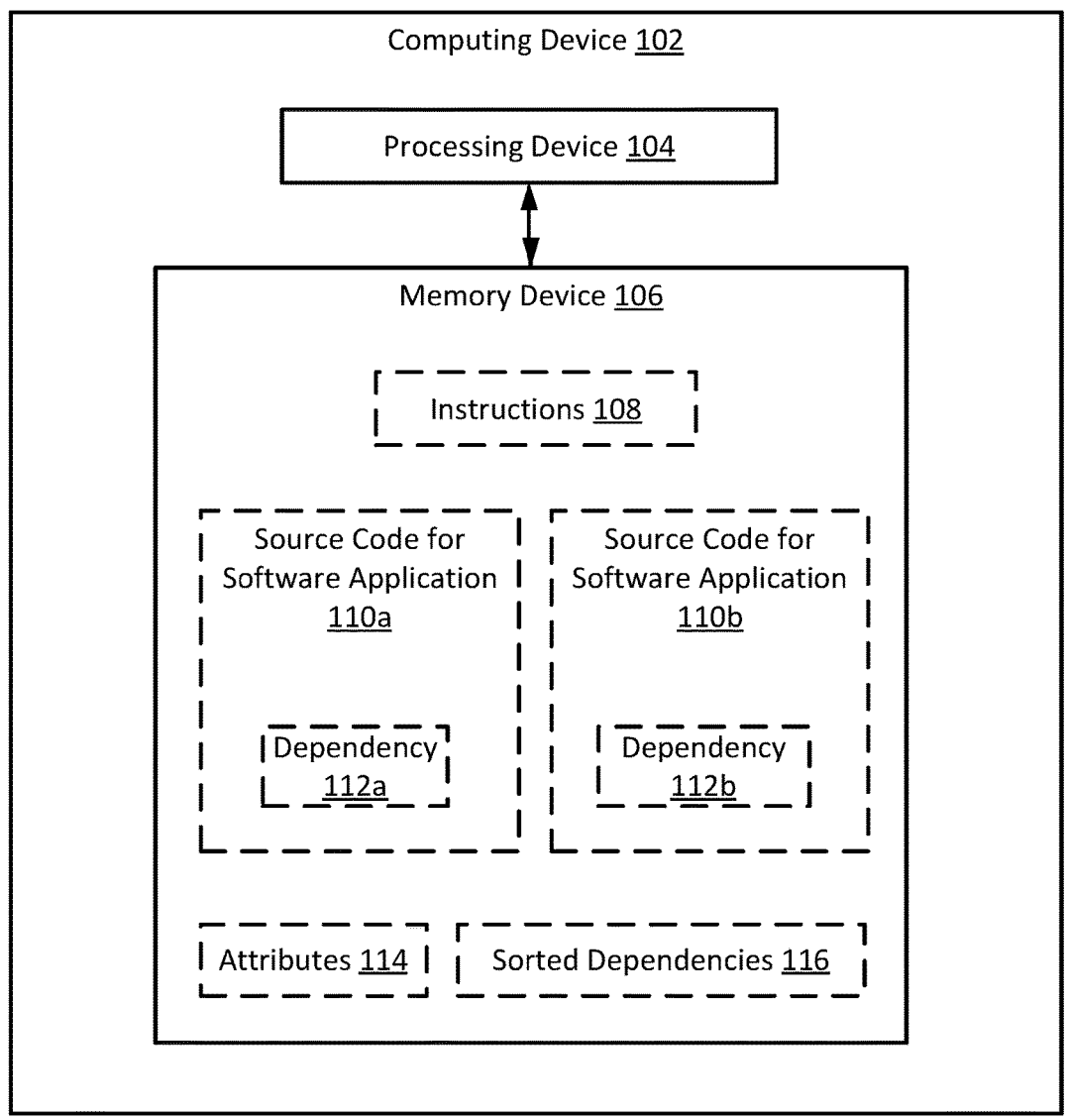
FIG. 1 is a block diagram of an example of a system for managing software dependencies according to some aspects.

There can be disadvantages to incorporating dependencies into source code for software. For example, different software developers may be responsible for maintaining the source code and the dependency, and these software developers may have little or no interaction with one another. And if the dependency is deleted, corrupted, or updated in a manner that is incompatible with the source code, the software may break. That is, the software may be unable to run, unable to implement a certain feature, unable to be compiled or built into executable code, output an error, or any combination of these. For example, multiple different websites may include references to a particular JavaScript file to implement graphical user interface features. The JavaScript file can be hosted and maintained by a third-party developer. If the third-party developer accidentally deletes the JavaScript file (or updates the JavaScript file in a manner that is incompatible with the rest of the source code for the websites), all of the websites may break. Further, a software developer may update source code so that the source code no longer requires, or is no longer compatible with, the dependency. But if the reference to the dependency is still present in the source code, the software may break or otherwise incorporate the unnecessary and cumbersome program code of the dependency.

Some examples of the present disclosure overcome one or more of the abovementioned issues by identifying dependencies relied on by a piece of software and providing useful information about the dependencies to enable a software developer to take corrective or preemptive action to prevent the software from breaking. The information can indicate whether a particular dependency is an essential dependency, an expiring dependency, an essential and expiring dependency, or a nonessential dependency. An essential dependency can be a dependency that is necessary for the software to run, to be built or compiled, to implement a particular feature, or any combination of these. A nonessential dependency can be a dependency that is unnecessary for the software to run, to be built or compiled, to implement some or all of its features, or any combination of these. An expiring dependency can be a dependency for which there is a newer version of the dependency available that is incompatible with the source code. For example, the newer version of the dependency may cause the source code to be unable to run, unable to be built or compiled, unable to implement some or all of its features, or may otherwise not be backwards compatible with the source code. An essential and expiring dependency can be a dependency that is both essential and expiring.

As a particular example, source code for a spreadsheet application may include a reference to a math library for implementing mathematical operations, such as addition, subtraction, and multiplication. The source code can also include a reference to an input/output (IO) library for receiving user input via a user input device and providing output to a display device. Examples of the user input device can be a keyboard, mouse, or touchscreen and examples of the display device can be a computer monitor or television. There can be a newer version of the IO library available that is incompatible with the source code. The source code can also include a reference to a database library for storing and retrieving data from database. But the program code for the database library may have previously been directly incorporated into the source code. In such an example, a computing device can analyze the source code for the spreadsheet application and determine that the math library is an essential dependency, the IO library is an expiring dependency, and the database library is a nonessential dependency. The computing device can then provide output indicating the attributes of some or all of these dependencies. This may enable the developer of the software application to take corrective or preemptive action, such as storing a copy of the math library locally as a backup, deleting the reference to the database library, and updating the source code to reference the newer version of the 10 library or an alternative 10 library.

Some dependencies referenced within source code may themselves rely on one or more other dependencies. For example, the database library may rely on a security library for encrypting communications over the Internet when accessing a remote database, a data storage library for writing data to a database, and a data retrieval library for retrieving data from a database. And each of those dependencies may further rely on additional dependencies. And so on. In some examples, the computing device can recursively analyze each dependency to identify some or all of the additional sub-dependencies that are directly or indirectly relied on by the source code. The computing device can then determine an attribute of each respective dependency. For example, the computing device can determine whether each respective dependency is an essential dependency, an expiring dependency, an essential and expiring dependency, non-essential dependency, etc. The computing device can then output, via a graphical user interface or notification, the attributes of some or all of the dependencies.

In some examples, the computing device can sort the dependencies according to their associated attributes. The computing device can sort the dependencies by assigning a rank, priority, or both to the dependencies based on their attributes. For example, the computing device can assign dependencies that are both essential and expiring a higher priority than dependencies that are just essential. And the computing device can assign dependencies that are essential a higher priority than dependencies that are nonessential. The computing device can output information that indicates the rank or priority of some or all of the dependencies. For example, the computing device can output the names of the dependencies in an ordered list from highest priority to lowest priority. Providing information about the rank or priority of the dependencies can enable a software developer to quickly and easily prioritize which dependencies to address.

In some examples, multiple software applications can be analyzed to determine higher-level details about dependencies across the software applications. For example, the computing device can analyze a suite of software applications to identify the dependencies that are directly and indirectly relied on by each of the software applications. In some examples, the computing device can then sort the dependencies using a technique similar to page rank. For example, the computing device can sort the dependencies to identify which dependencies are relied on by the highest number of pieces of software, the most important pieces of software, or both of these. A piece of software can include a software application, a dependency, or both. The computing device can then flag those dependencies as critical dependencies. This may enable a software developer to take preemptive action with respect to a critical dependency, such as by switching to an open-source version of the critical dependency that may be more reliable or stable. Additionally or alternatively, the computing device can flag software applications that rely on a high number of expiring dependencies as fragile applications or a high number of nonessential dependencies as bloated applications. For example, the computing device can determine that a software application relies on a number of expiring dependencies exceeding a predefined threshold and flag the software application as fragile. Some or all of these features and processes can be repeatedly and automatically iterated for assessing, tracking, sorting, flagging, and otherwise managing dependencies in software applications.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for managing software dependencies according to some aspects. The system includes a computing device 102 having a processing device 104 and a memory device 106. In some examples, the processing device 104 and memory device 106 can be integrated into a single structure, such as a single housing. In other examples, the processing device 104 and memory device 106 can be distributed or remote from one another and in electrical communication with each other.

The processing device 104 can execute one or more operations for managing software dependencies. The processing device 104 can execute instructions 108 stored in the memory device 106 to perform the operations. The processing device 104 can include one processing device or multiple processing devices. Non-limiting examples of the processing device 104 include a Field-Programmable Gate Array (FPGA), an application-specific integrated circuit (ASIC), a microprocessing device, etc.

The processing device 104 can be communicatively coupled to the memory device 106 via a bus. The memory device 106 can be non-volatile and may include any type of memory device that retains stored information when powered off. Non-limiting examples of the memory device 106 include electrically erasable and programmable read-only memory (EEPROM), flash memory, or any other type of non-volatile memory. In some examples, at least some of the memory device 106 can include a medium from which the processing device 104 can read the instructions 108. A computer-readable medium can include electronic, optical, magnetic, or other storage devices capable of providing the processing device 104 with computer-readable instructions or other program code. Non-limiting examples of a computer-readable medium include magnetic disk(s), memory chip(s), ROM, random-access memory (RAM), an ASIC, a configured processing device, optical storage, or any other medium from which a computer processing device can read instructions. The instructions 108 can include processing device-specific instructions generated by a compiler or an interpreter from code written in any suitable computer-programming language, such as C, C++, C#, etc.

The memory device 106 can include source code for one or more software applications 110a-b. Source code can include instructions written in one or more programming languages and can be in a human-understandable format. A software application can include a website, a website application, system software, application software, a standalone application, a utility application, an operating system, a game, or any other type of software for causing a processing device 104 to perform one or more tasks. Examples of a utility application can include a word processor, an accounting program, a database program, or an illustration program.

Figure 2:
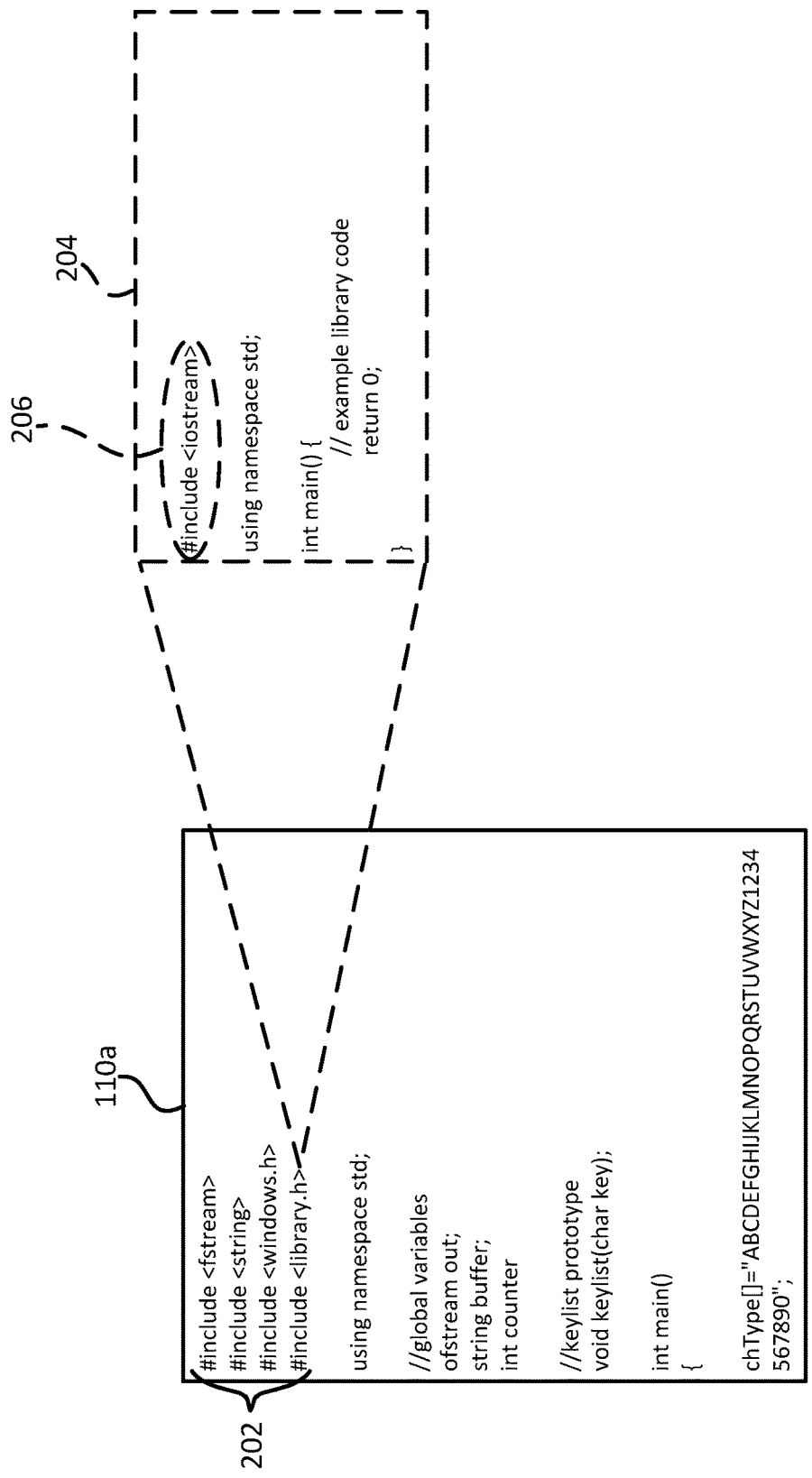
FIG. 2 is a block diagram of an example of source code for a software application according to some aspects.

The source code for the software applications 110a-b can each include references to dependencies 112a-b. For example, FIG. 2 shows an example of a portion of the source code for the software application 110a. The source code can include multiple "#include" statements 202 that reference various dependencies, such as fstream, string, windows.h, and library.h. In some examples, each of those dependencies may further include additional dependencies. For example, the program code 204 for library.h can have its own "#include" statements that reference additional dependencies 206, such as iostream. Those dependencies may, in turn, rely on even more dependencies. And so on. In some examples, a software application can rely on hundreds or thousands of dependencies and sub-dependencies.

As another example, the source code for the software application 110*b* can be source code for a website. The source code can include multiple "<script>" tags, "<link>" tags, or both that reference various dependencies. For example, the source code can include "<script type='text/javascript' src='jquery.js'></script>," which can reference the dependency jquery.js. The source code for the software applications 110*a-b* can include any number, combination, and type of references to any number, combination, and type of dependencies 112*a-b*.

The processing device 104 can analyze the dependencies 112*a-b* and determine attributes 114 associated with the dependencies 112*a-b*. For example, the processing device 104 can analyze the dependency 112*a* and determine if the dependency 112*a* is an essential dependency, a nonessential dependency, an expiring dependency, or any combination of these. The processing device 104 can additionally or alternatively analyze some or all of the sub-dependencies on which dependency 112*a* relies to determine attributes associated with those sub-dependencies. In some examples, the processing device 104 can transmit a notification or otherwise output an indication of the attributes of some or all of the dependencies and sub-dependencies associated with the source code for the software application 110*a*.

Although the system of FIG. 1 includes source code for two software applications, in other examples, the system can include source code for any number and combination of software applications. For example, the system can include dozens (or hundreds) of software applications that collectively rely on thousands (or hundreds of thousands) of dependencies. The system can analyze these software applications, determine information about some or all of these dependencies, and provide this information to a user. But such a large amount of information about such a high number of dependencies may be overwhelming for the user. In some examples, the system can reduce overcome this issue by identifying the most important or most critical dependencies and other information about the dependencies and presenting this information in an intuitive way that is easily digestible for the user.

For example, the processing device 104 can output a graphical user interface that provides information about the dependencies to a user. In some examples, the processing device 104 can flag a software application within the graphical user interface based on one or more criteria. For example, the processing device 104 can determine if the source code for the software application 110*a* relies on a number of expiring dependencies that exceeds a predetermined threshold. If so, the processing device 104 can flag the software application as being fragile, unstable, or otherwise suboptimal. As another example, the processing device 104 can determine if the source code for the software application 110*a* relies on a number of nonessential dependencies that exceeds a predetermined threshold. If so, the processing device 104 can flag the software application as being bloated or otherwise suboptimal.

In some examples, the processing device 104 may designate certain dependencies as having a high overall importance, and the processing device 104 may only present information about those dependencies via the graphical user interface. This may cut back on the amount of information presented to a user so as not to overwhelm the user. For example, the graphical user interface can include a list of dependencies that are classified as having high overall importance in the graphical user interface. And, among those dependencies, the list can be ordered from highest overall importance to lowest overall importance. This may enable software developers to focus their attention on, and triage, the most important dependencies. The processing device 104 can sort the dependencies using any number and combination of techniques and display some or all of the sorted dependencies 116.

In some examples, the processing device 104 can receive user input, via a user input device, that is associated with the selection of a particular software application via the graphical user interface. In response to the user input, the processing device 104 can update the graphical user interface to output information about the dependencies associated with that software application. For example, the processing device 104 can output a tree representing the relationship among some or all of the dependencies on which the software application relies. The dependencies in the tree can be color coded or otherwise have indicators to specify whether the dependencies are essential, expiring, essential and expiring, or nonessential.

In some examples, the processing device 104 can implement one or more of the above-mentioned features by implementing some or all of the steps shown in FIGS. 3-6. Some examples can include more, fewer, or different steps than the steps depicted in FIGS. 3-6. The steps of FIGS. 3-6 are described with reference to components described above with regard to FIG. 1.

Figure 3:
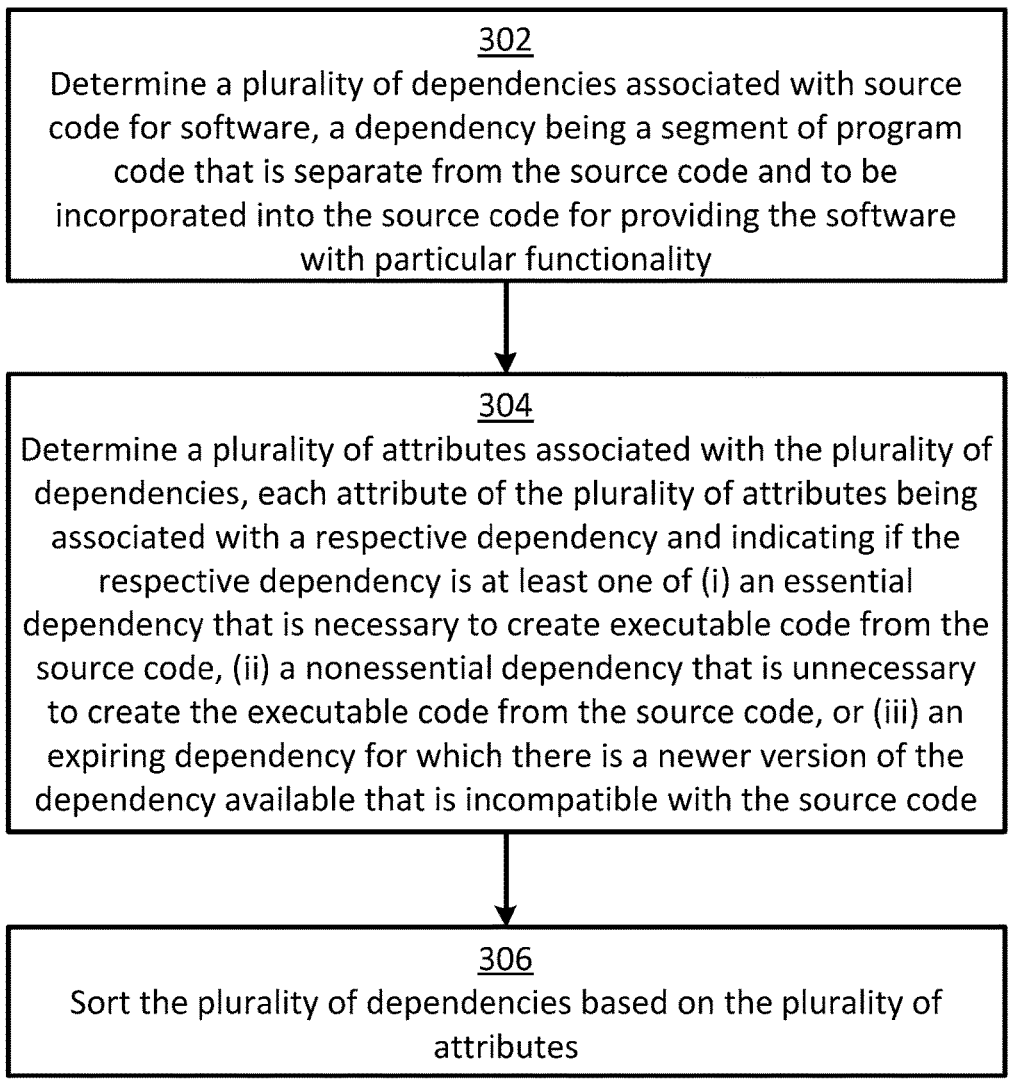
FIG. 3 is a flow chart showing an example of a process for managing software dependencies according to some aspects.

Turning to FIG. 3, in block 302, the processing device 104 determines multiple dependencies associated with source code for software. A dependency can be a segment of program code that is separate from the source code and to be incorporated into the source code. The dependency may be incorporated into the source code during a compilation process, a build process, or at runtime. The dependency can provide the software with particular functionality.

For example, the processing device 104 can analyze the source code for software application 110*a* to identify references to dependencies within the source code. An example of a reference to a dependency can be an include tag, a script tag, or a link tag. The processing device 104 can then analyze the references to identify the names of the dependencies, the versions of the dependencies, or other information about the dependencies. For example, the processing device 104 can analyze the code segment "#include <library_2.3.h>" within the source code to determine that a dependency is version 2.3 of library.h. In some examples, the processing device 104 may then analyze the dependencies to identify further dependencies. For example, the processing device 104 may analyze the program code in the file library_2.3.h to identify further dependencies. The processing device 104 can recursively repeat this process to identify some or all of the dependencies associated with the source code for the software application 110*a*.

In block 304, the processing device 104 determines multiple attributes associated with the multiple dependencies. Each attribute can be associated with a respective dependency and can indicate if the respective dependency is an essential dependency, a nonessential dependency, an expiring dependency, or any combination of these. In some examples, the processing device 104 can determine some or all of the attributes for some or all of the dependencies by performing the steps shown in FIGS. 4-5.

Figure 4:
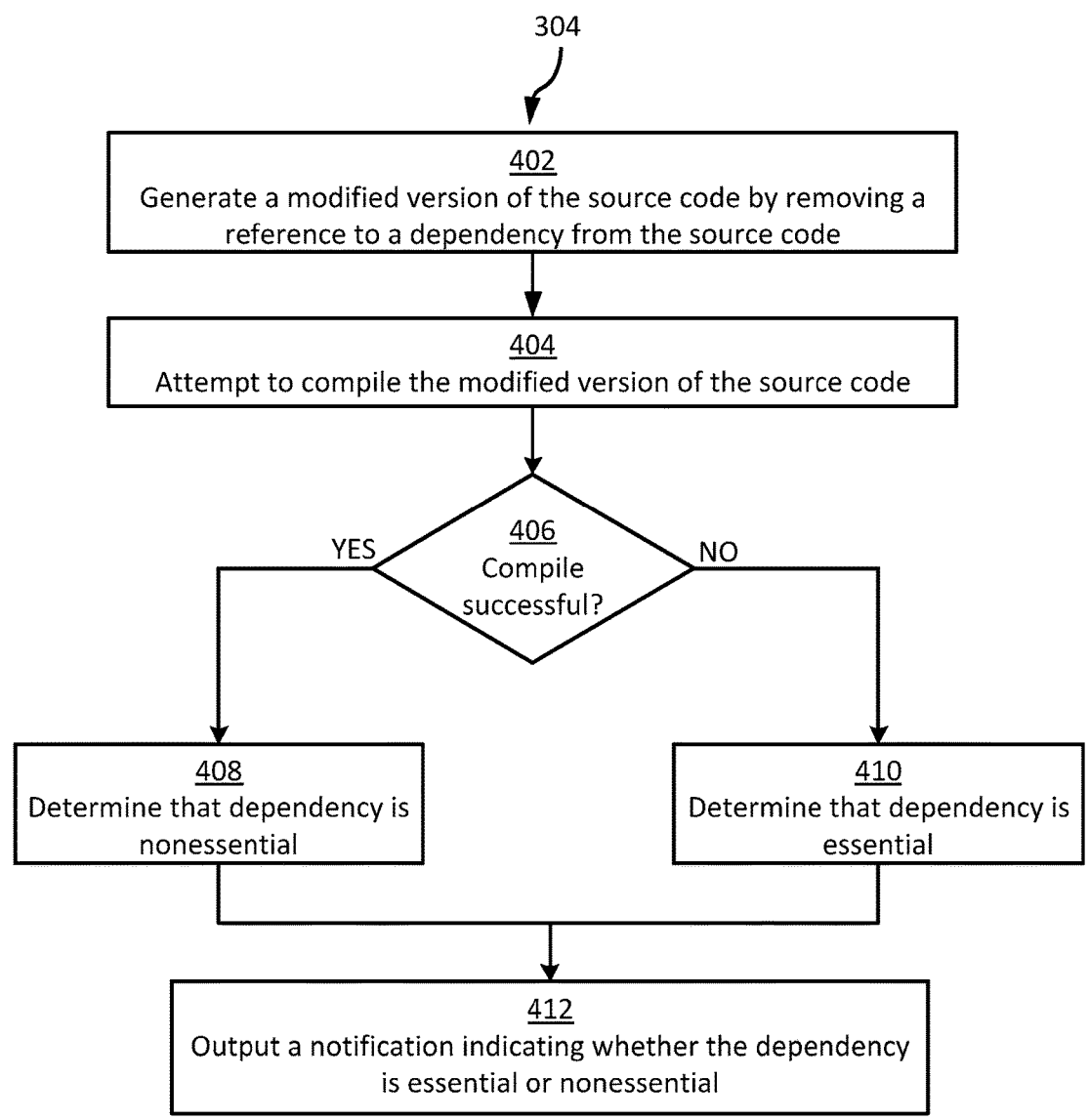
FIG. 4 is a flow chart showing an example of a process for determining if a dependency is essential or nonessential according to some aspects.

For example, turning to FIG. 4, in block 402, the processing device 104 generates a modified version of the source code by removing a reference to the dependency from the source code. For example, the processing device 104 can create a temporary version of the source code in which the processing device 104 has removed the line "#include <library_2.3.h>" from the source code.

In block 404, the processing device 104 attempts to compile the modified version of the source code into executable code. For example, the processing device 104 can use a compiler to attempt to compile the source code into object code. Object code can be executable code that can be run by the processing device 104. Additionally or alternatively, the processing device 104 can use an interpreter or a build tool to attempt to interpret or build, respectively, the modified version of the source code. An example of an interpreter can be a JavaScript engine of a website browser.

If the attempt(s) by the processing device 104 are successful, the process can proceed to block 408, where the processing device 104 can determine that the dependency is nonessential. The attempt(s) can be successful if there are no errors or if there are errors unrelated to the dependency. If the attempt(s) by the processing device 104 are unsuccessful, the process can proceed to block 410, where the processing device 104 can determine that the dependency is essential.

In some examples, the process can then proceed to block 412 in which the processing device 104 can output a notification indicating whether the dependency is essential or nonessential. For example, the processing device 104 can output an alert indicating that the dependency is essential. Additionally or alternatively, the processing device 104 can store a correlation between the dependency and its associated attribute in a database in memory, such as memory device 106.

Figure 5:
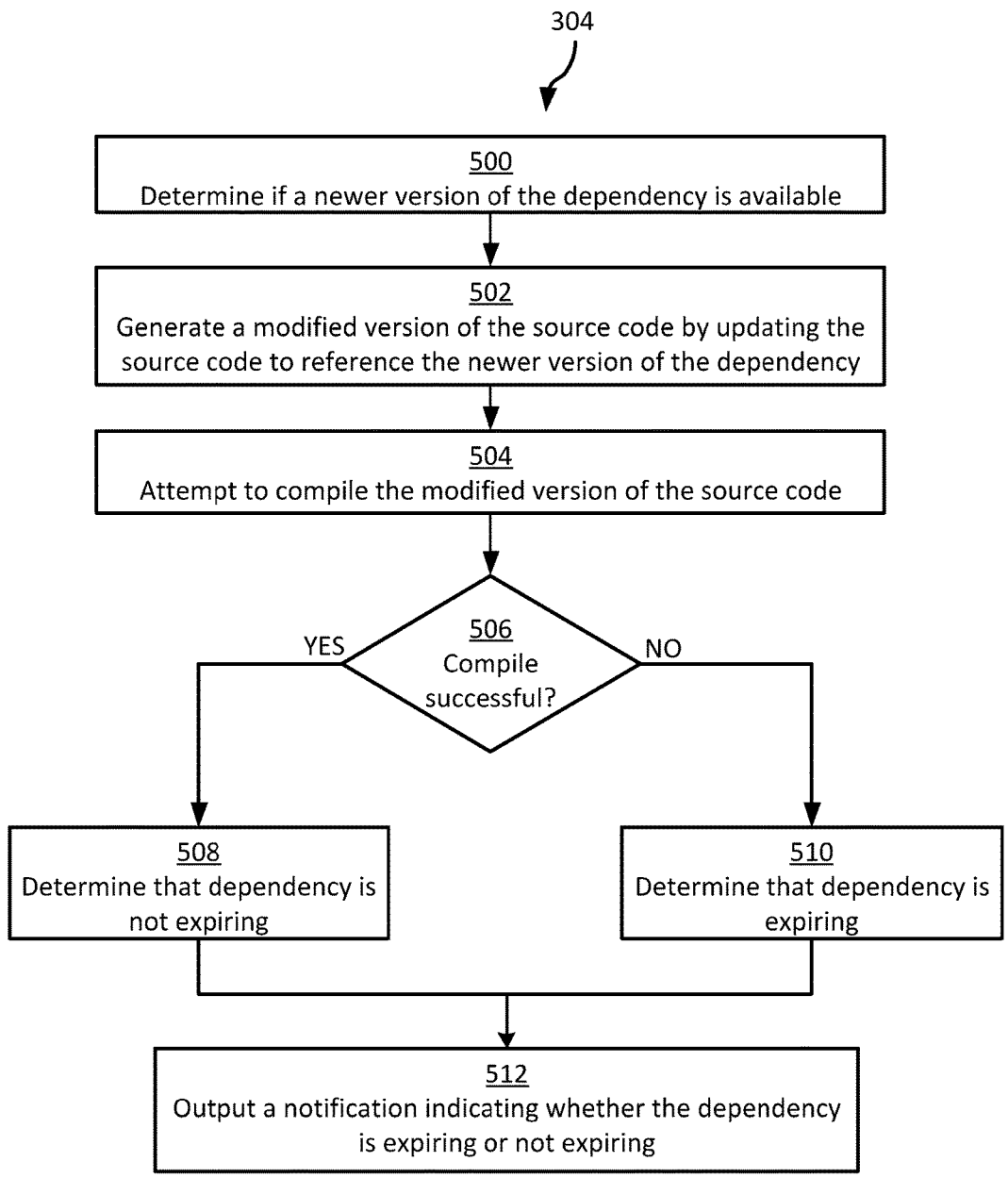
FIG. 5 is a flow chart showing an example of a process for determining if a dependency is expiring or not expiring according to some aspects.

Turning now to FIG. 5, in block 500, the processing device 104 determines if a newer version of the dependency is available. In some examples, the processing device 104 can determine if the newer version of the dependency is available by accessing a database, such as a database stored in memory device 106 or on a remote server. The database can correlate one or more dependencies with associated websites, servers, distributors, version numbers, or any combination of these. In some examples, the processing device can use the database to determine a website or server associated with a provider of the dependency. The processing device can access and analyze the website or query the server to obtain information about the latest version of the dependency. The processing device can determine, based on that information, if a newer version of the dependency is available.

As a particular example, the processing device 104 can determine that the source code for the software application 110a includes a reference to version 2.3 of library.h. The processing device 104 can access a database to determine a website associated with library.h. The processing device 104 can then access the website to determine if a newer version, such as version 2.4, of library.h is available. If so, the processing device 104 can retrieve the newer version of library.h. For example, the processing device 104 can download the newer version of library.h from the website. Additionally or alternatively, the processing device 104 can determine a path, such as a uniform resource locator (URL) address, to the newer version of library.h.

In some examples, a provider of the dependency can transmit a communication to the processing device 104 indicating (i) that a new version of a dependency is available; (ii) a version number for the new version; (iii) a URL or other path for retrieving the newer version of dependency; or (iv) any combination of these. For example, the provider of library.h can transmit a communication, via the Internet, to the processing device 104 indicating that a new version of library.h is available, that the new version is version number 2.4, and that the new version is available at the website address http://www.libraryDotH.com/new (which is an exemplary URL used for illustrative purposes). The processing device 104 can receive the communication and determine, based on the communication, that a newer version of the dependency is available, a version number for the newer version of the dependency, where to retrieve the newer version of the dependency, or any combination of these. The processing device 104 may then retrieve the newer version of the dependency using the URL indicated in the communication.

In block 502, the processing device 104 generates a modified version of the source code by updating the source code to reference the newer version of the dependency. For example, the processing device can create a temporary version of the source code in which the line "#include <library_2.3.h>" is updated to "#include <library_2.4.h>".

In block 504, the processing device 104 attempts to compile the modified version of the source code into executable code. For example, the processing device 104 can use a compiler to attempt to compile the source code into object code. Additionally or alternatively, the processing device 104 can use an interpreter or a build tool to attempt to interpret or build, respectively, the modified version of the source code.

If the attempt(s) by the processing device 104 are successful, the process can proceed to block 508, where the processing device 104 can determine that the dependency is not expiring. If the attempt(s) by the processing device 104 are unsuccessful, the process can proceed to block 510, where the processing device 104 can determine that the dependency is expiring.

In some examples, the process can then proceed to block 512 in which the processing device 104 can output a notification indicating whether the dependency is expiring or not expiring. Additionally or alternatively, the processing device 104 can store a correlation between the dependency and its associated attribute(s) in a database in memory. For example, if a particular dependency is both essential and expiring, the processing device 104 can include an entry in a table in the database that correlates the particular dependency with attributes of expiring and essential.

Returning to FIG. 3, in block 306, the processing device 104 sorts the multiple dependencies based on the multiple attributes. In some examples, the processing device 104 can sort the multiple dependencies by performing some or all of the steps shown in FIG. 6.

In block 602, the processing device 104 can assign a priority to a dependency of the multiple dependencies based on one or more attributes associated with the dependency. For example, the processing device 104 can access a database to determine one or more attributes associated with a particular dependency. The processing device 104 can assign a higher priority to the dependency if the dependency is designated as both essential and expiring than if the dependency is only designated as essential. The processing device 104 can assign a higher priority to the dependency if the dependency is designated as essential than if the dependency is designated as nonessential. In some examples, the processing device 104 can repeat this process for some or all of the dependencies of the multiple dependencies to assign a priority to those dependencies.

In block 604, the processing device 104 ranks the dependency among the multiple dependencies. For example, the processing device 104 can determine a number of pieces of software that rely on the dependency. The processing device 104 can assign a higher rank to a dependency that is relied on by a higher number of pieces of software and a lower rank to a dependency that is relied on by a lower number of pieces of software.

Additionally or alternatively, the processing device 104 can determine a rank for a dependency based on the importance of the pieces of software that rely on the dependency. For example, each piece of software can be assigned a weight. The weight can be a numerical value indicative of the importance of the piece of software. A higher weight can indicate higher importance and a lower weight can indicate lower importance. The processing device 104 can determine the weight for each piece of software that relies on the dependency. For example, the processing device 104 can access a database that has software associated with weights to determine a weight for each piece of software that relies on the dependency. The processing device 104 can then add together the weights for all of the pieces of software that rely on the dependency to determine a score for the dependency. The processing device 104 can assign a higher rank to a dependency that is has a higher score and a lower rank to a dependency that has a lower score.

In block 606, the processing device 104 determines an overall importance of the dependency based on the priority, the rank, or both. In one example, the processing device 104 can determine that a dependency that has a high rank and a low priority, because the dependency is nonessential for many or all of the pieces of software that rely on the dependency. Based on these factors, the processing device 104 can determine that the dependency has a low overall importance. As another example, the processing device 104 can determine that a dependency that has a high rank and a high priority, because the dependency is essential, expiring, or both for many or all of the pieces of software that rely on the dependence. Based on these factors, the processing device 104 can determine that the dependency has a high overall importance. The processing device 104 can use any combination of the priority and rank to determine the overall importance of a dependency.

Figure 6:
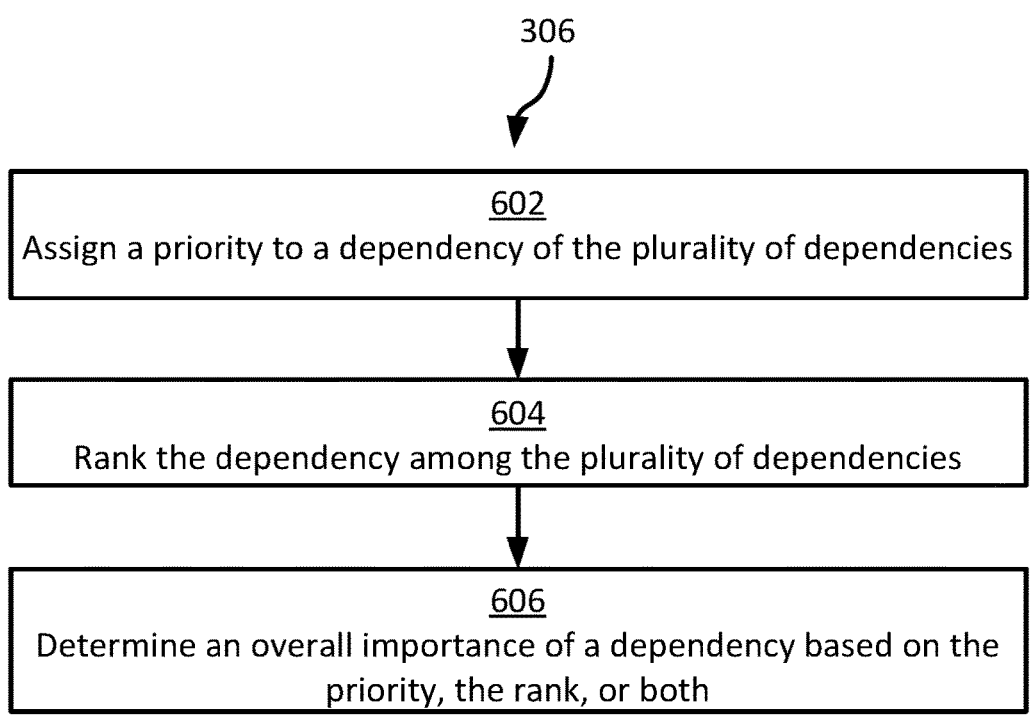
FIG. 6 is a flow chart showing an example of a process for ranking dependencies according to some aspects.

The processing device 104 can repeat the steps of FIG. 6 to determine the priority, rank, overall importance, or any combination of these for some or all of the dependencies among the multiple dependencies. The processing device 104 can then sort, arrange, or otherwise organize the dependencies according to their priority, rank, overall importance, or any combination of these.

In some examples, some or all of the above features can be integrated into a system that can dynamically and automatically (e.g., with little or no user interaction) identify new releases of dependencies, new source code for software applications, updated source code for software applications 110a-b, or any combination of these. The system can re-determine or update the priorities, ranks, overall importance, or any combination of these for a group of dependencies based on these factors. The system can then provide updated information about the dependencies to the user.

For example, the system can periodically check with producers of dependencies to determine if newer versions of the dependencies are available. The system may check with the producers of the dependencies by accessing the websites associated with the dependencies. If newer versions of the dependencies are available, the processing device 104 can perform some or all of the steps shown in FIG. 5 to determine if the dependencies are expiring or to check the backwards compatibility of the newer versions of the dependencies. As another example, a user may write source code for a new software application. The processing device 104 may automatically detect the new source code and analyze the source code to identify nonessential or expiring dependencies. The processing device 104 can then notify the user if the processing device 104 identifies any such dependencies. As yet another example, a user may update source code for a software application 110a. The processing device 104 may automatically detect that the source code has been updated and analyze the source code to identify any nonessential or expiring dependencies. The processing device 104 can then notify the user if the processing device 104 identifies any such dependencies.

In some examples, some or all of the above-mentioned features can be integrated into a build tool for building software applications. A build tool can be, or can include, a compiler for compiling software applications. For example, a user may select a "dependency check" option in the build tool. The user may then press a compile button of the build tool to compile the source code for a software application into executable code. In response to detecting that the dependency check option is selected and that the compile button was pressed, the processing device 104 can automatically analyze the dependencies referenced within the source code to determine the attributes of the dependencies. The processing device 104 can then output information about the attributes of the dependencies to the user.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A method comprising:
   determining, by a processing device, a plurality of dependencies associated with source code for software, a dependency being a segment of program code that is separate from the source code and to be incorporated into the source code for providing the software with particular functionality;
   categorizing, by the processing device, the plurality of dependencies into a plurality of categories, each dependency of the plurality of dependencies being categorized as at least one of (i) an essential dependency that is necessary to create executable code from the source code,
   (ii) a nonessential dependency that is unnecessary to create the executable code from the source code, or
   (iii) an expiring dependency for which there is a newer version of the dependency available that is incompatible with the source code, wherein at least one dependency in the plurality of dependencies is categorized as the essential dependency by:
   generating a modified version of the source code by removing a reference to the at least one dependency from the source code, and
   based on a compiler being unable to create the executable code from the modified version of the source code, determining that the at least one dependency is to be categorized as the essential dependency; and sorting, by the processing device, the plurality of dependencies based on the plurality of categories.

2. The method of claim 1, further comprising sorting the plurality of dependencies based on the plurality of categories by arranging (i) expiring dependencies as having higher priority than essential dependencies, and (ii) essential dependencies as having higher priority than nonessential dependencies.

3. The method of claim 1, wherein the software comprises a plurality of software applications, and further comprising sorting the plurality of dependencies by ranking each respective dependency of the plurality of dependencies based on a number of software applications in the plurality of software applications that rely on the respective dependency.

4. The method of claim 1, further comprising categorizing the at least one dependency as the essential dependency by:

initiating compilation of the modified version of the source code into the executable code.

5. The method of claim 1, further comprising categorizing a particular dependency of the plurality of dependencies as the expiring dependency by:

generating an altered version of the source code by updating the source code to reference the newer version of the particular dependency;

initiating compilation of the altered version of the source code into the executable code; and based on a compiler being unable to create the executable code from the altered version of the source code, determining that the particular dependency is to be categorized as the expiring dependency.

6. The method of claim 5, further comprising:

outputting a notification indicating that the particular dependency is expiring based on determining that the particular dependency is categorized as the expiring dependency.

7. The method of claim 1, further comprising determining the plurality of dependencies associated with the source code by recursively analyzing each dependency of the plurality of dependencies to identify additional dependencies.

8. A non-transitory computer readable medium comprising program code that is executable by a processing device for causing the processing device to:

determine a plurality of dependencies associated with source code for software, a dependency being a segment of program code that is separate from the source code and to be incorporated into the source code for providing the software with particular functionality;

categorize the plurality of dependencies into a plurality of categories, each dependency of the plurality of dependencies being categorized as at least one of (i) an essential dependency that is necessary to create executable code from the source code, (ii) a nonessential dependency that is unnecessary to create the executable code from the source code, or (iii) an expiring dependency for which there is a newer version of the dependency available that is incompatible with the source code, wherein at least one dependency in the plurality of dependencies is categorized as the essential dependency by:

generating a modified version of the source code by removing a reference to the at least one dependency from the source code, and based on a compiler being unable to create the executable code from the modified version of the source code, determining that the at least one dependency is to be categorized as the essential dependency; and sort the plurality of dependencies based on the plurality of categories.

9. The non-transitory computer readable medium of claim 8, further comprising program code that is executable by the processing device for causing the processing device to sort the plurality of dependencies by arranging (i) expiring dependencies as having higher priority than essential dependencies, and (ii) essential dependencies as having higher priority than nonessential dependencies.

10. The non-transitory computer readable medium of claim 8, wherein the software comprises a plurality of software applications, and further comprising program code that is executable by the processing device for causing the processing device to sort the plurality of dependencies by ranking each respective dependency of the plurality of dependencies based on a number of software applications in the plurality of software applications that rely on the respective dependency.

11. The non-transitory computer readable medium of claim 8, wherein the reference to the at least one dependency is a first reference, and further comprising program code that is executable by the processing device for causing the processing device to determine that a particular dependency of the plurality of dependencies is to be categorized as the nonessential dependency by:

generating an altered version of the source code by removing a second reference to the particular dependency from the source code;

initiating compilation of the altered version of the source code into the executable code;

based on the compiler being able to create the executable code from the altered version of the source code, determining that the particular dependency is to be categorized as the nonessential dependency.

12. The non-transitory computer readable medium of claim 8, further comprising program code that is executable by the processing device for causing the processing device to determine that a particular dependency of the plurality of dependencies is to be categorized as the expiring dependency by:

generating an altered version of the source code by updating the source code to reference the newer version of the particular dependency;

initiating compilation of the altered version of the source code into the executable code; and based on a compiler being unable to create the executable code from the altered version of the source code, determining that the particular dependency is to be categorized as the expiring dependency.

13. The non-transitory computer readable medium of claim 8, further comprising program code that is executable by the processing device for causing the processing device to:

output a first notification indicating that a particular dependency is expiring based on determining that the particular dependency is categorized as the expiring dependency;

output a second notification indicating that the particular dependency is essential based on determining that the particular dependency is categorized as the essential dependency; and output a third notification indicating that the particular dependency is nonessential based on determining that the particular dependency is categorized as the nonessential dependency.

14. The non-transitory computer readable medium of claim 8, further comprising program code that is executable by the processing device for causing the processing device to determine the plurality of dependencies associated with the source code by recursively analyzing each dependency of the plurality of dependencies to identify additional dependencies.

15. A system comprising:
a processing device; and
a memory device that includes:
source code for a plurality of software applications; and
instructions that are executable by the processing device for causing the processing device to:
determine a plurality of dependencies associated with the source code, a dependency being a segment of program code that is separate from the source code and to be incorporated into the source code for providing the software with particular functionality;
categorize the plurality of dependencies into a plurality of categories, each dependency of the plurality of dependencies being categorized as at least one of (i) an essential dependency that is necessary to create executable code from the source code, (ii) a nonessential dependency that is unnecessary to create the executable code from the source code, or
(iii) an expiring dependency for which there is a newer version of the dependency available that is incompatible with the source code,
wherein at least one dependency in the plurality of dependencies is categorized as the essential dependency by:
generating a modified version of the source code by removing a reference to the at least one dependency from the source code, and
based on a compiler being unable to create the executable code from the modified version of the source code, determining that the at least one dependency is to be categorized as the essential dependency; and
sort the plurality of dependencies based on the plurality of categories.

16. The system of claim 15, wherein the memory device further includes instructions that are executable by the processing device for causing the processing device to sort the plurality of dependencies by arranging (i) expiring dependencies as having higher priority than essential dependencies, and (ii) essential dependencies as having higher priority than nonessential dependencies.

17. The system of claim 15, wherein the memory device further includes instructions that are executable by the processing device for causing the processing device to sort the plurality of dependencies by ranking each respective dependency of the plurality of dependencies based on a number of software applications in the plurality of software applications that rely on the respective dependency.

18. The system of claim 15, wherein the reference to the at least one dependency is a first reference, and wherein the memory device further includes instructions that are executable by the processing device for causing the processing device to determine that a particular dependency of the plurality of dependencies is to be categorized as the essential dependency or the nonessential dependency by:
generating an altered version of the source code by removing a second reference to the particular dependency from the source code;
initiating compilation of the altered version of the source code into the executable code;
based on the compiler being able to create the executable code from the altered version of the source code, determining that the particular dependency is to be categorized as the nonessential dependency.

19. The system of claim 15, wherein the memory device further includes instructions that are executable by the processing device for causing the processing device to determine that a particular dependency of the plurality of dependencies is to be categorized as the expiring dependency by:
generating an altered version of the source code by updating the source code to reference the newer version of the particular dependency;
initiating compilation of the modified altered version of the source code into the executable code; and
based on a compiler being unable to create the executable code from the altered version of the source code, determining that the particular dependency is to be categorized as the expiring dependency.

20. The system of claim 15, wherein the memory device further includes instructions that are executable by the processing device for causing the processing device to:
output a first notification indicating that a particular dependency is expiring based on determining that the particular dependency is categorized as the expiring dependency;
output a second notification indicating that the particular dependency is essential based on determining that the particular dependency is categorized as the essential dependency; and
output a third notification indicating that the particular dependency is nonessential based on determining that the particular dependency is categorized as the nonessential dependency.

* * * * *